F. TRINKS.
CALCULATING MACHINE.
APPLICATION FILED NOV. 26, 1906.
979,358.
Patented Dec. 20, 1910.
6 SHEETS—SHEET 1.
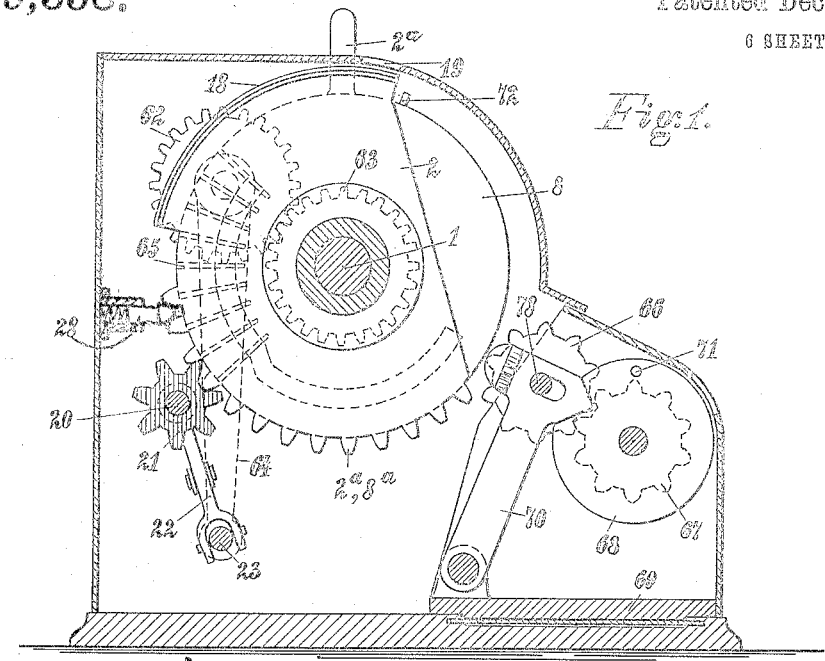
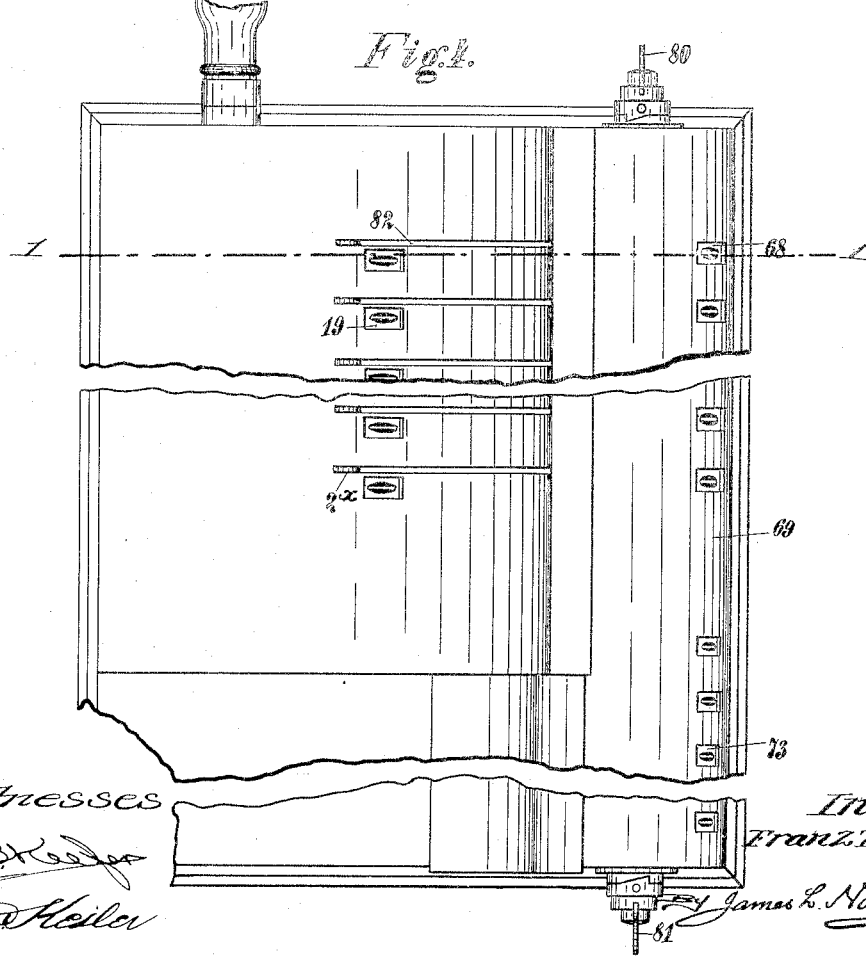
Witnesses
Inventor
Franz Trinks
By James L. Norris
Atty F. TRINKS.
CALCULATING MACHINE.
APPLICATION FILED NOV. 26, 1906.
979,358.
Patented Dec. 20, 1910.
6 SHEETS—SHEET 2.
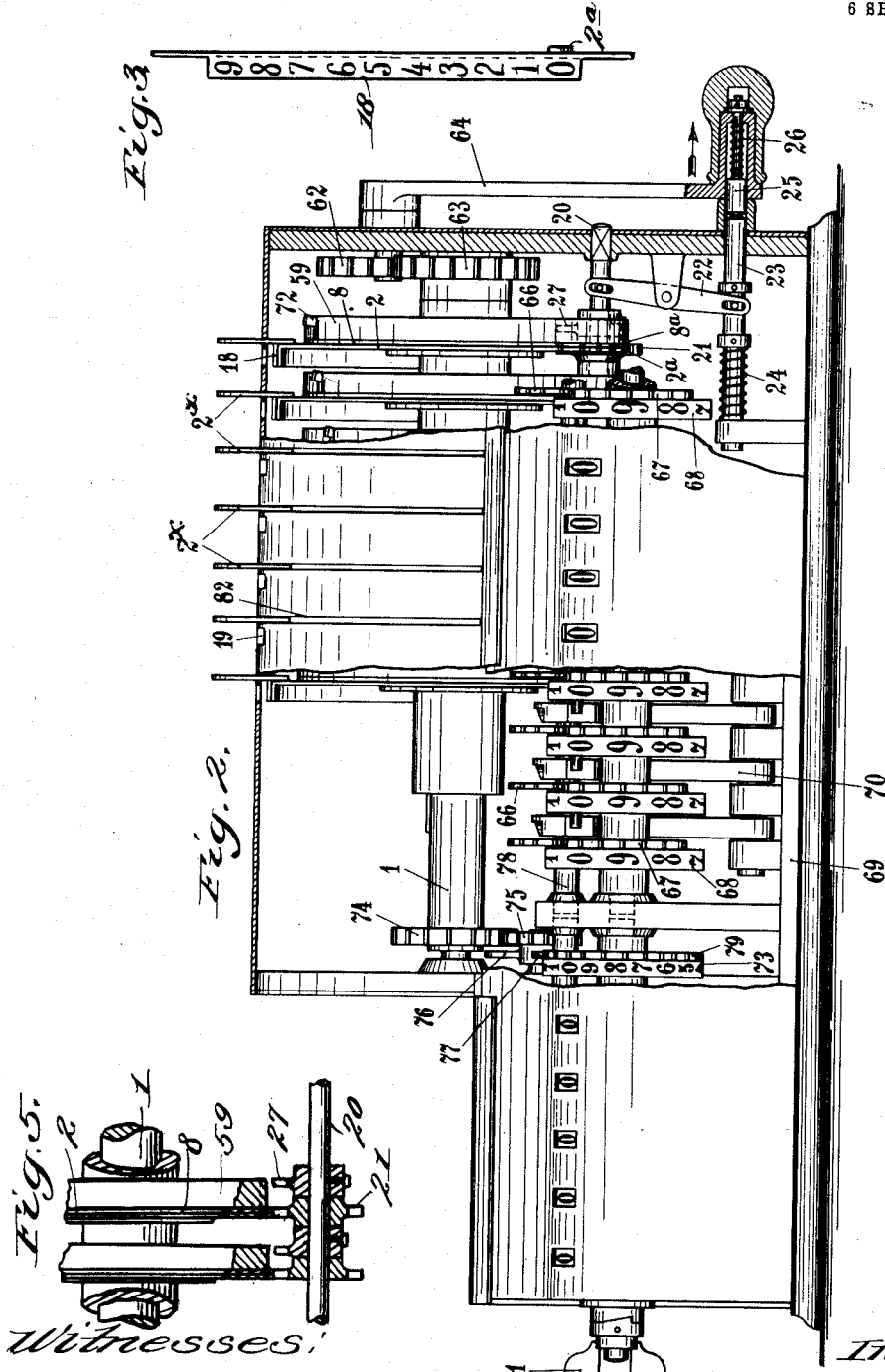
Witnesses:
Inventor
Franz Trinks
By James L. Norris
Atty.

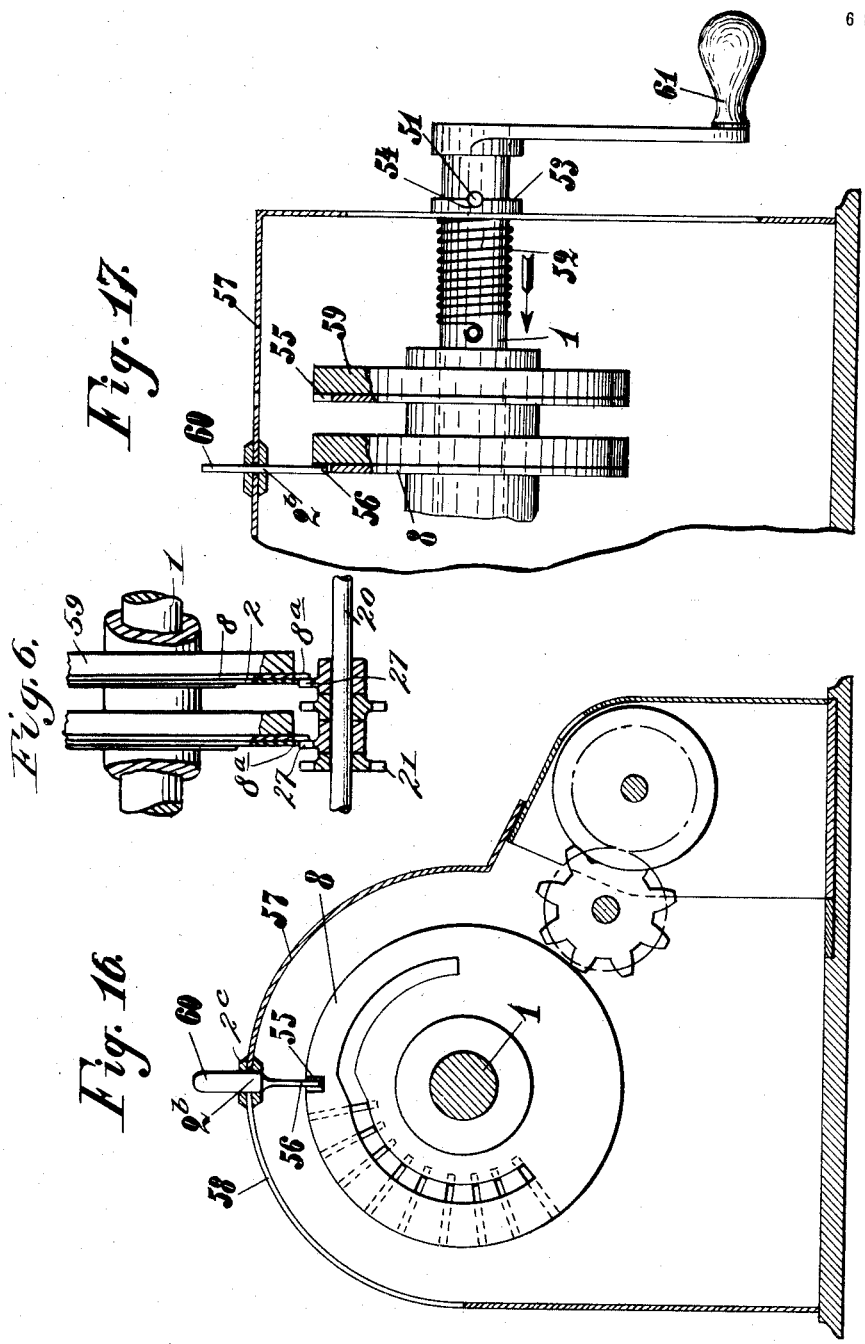

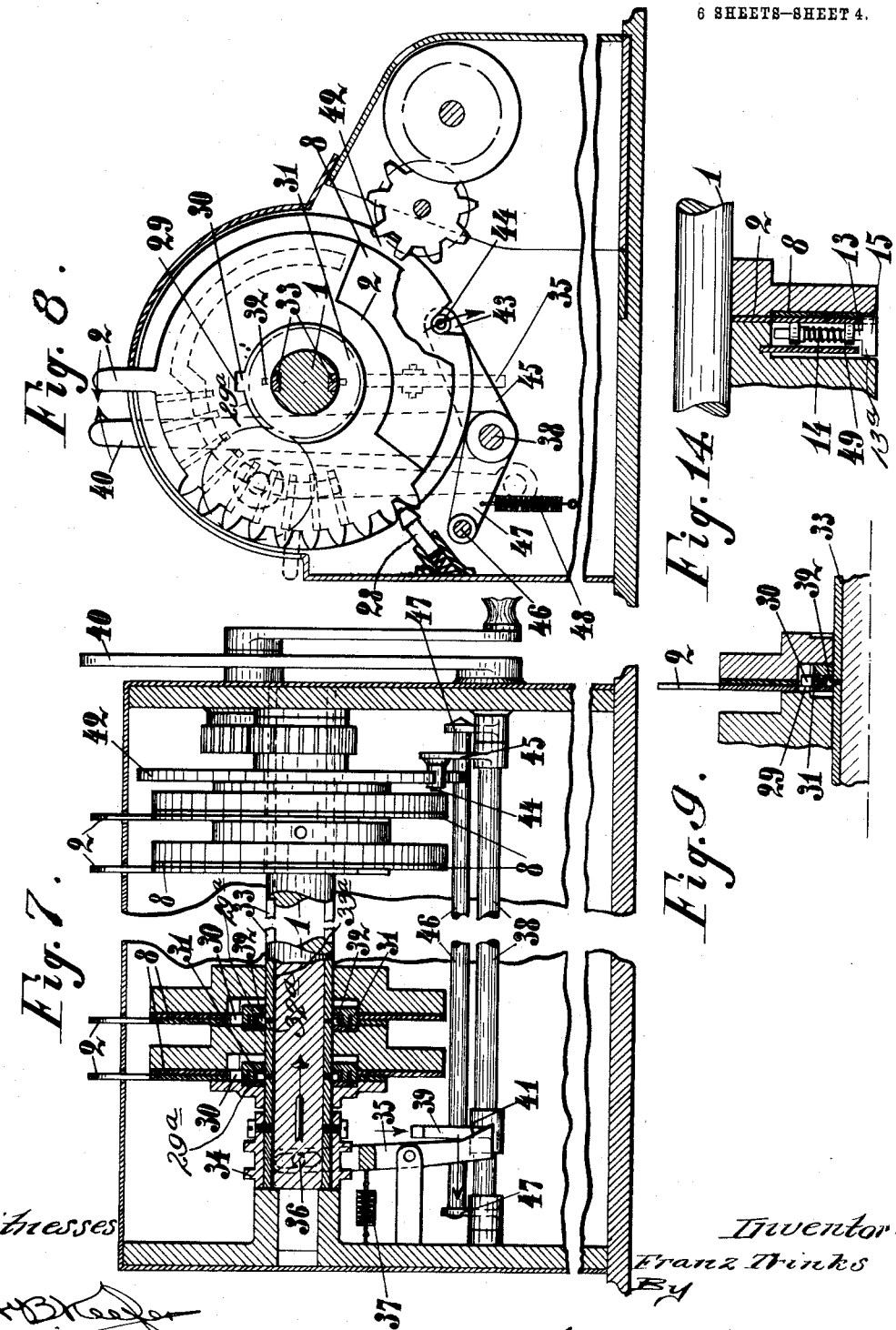

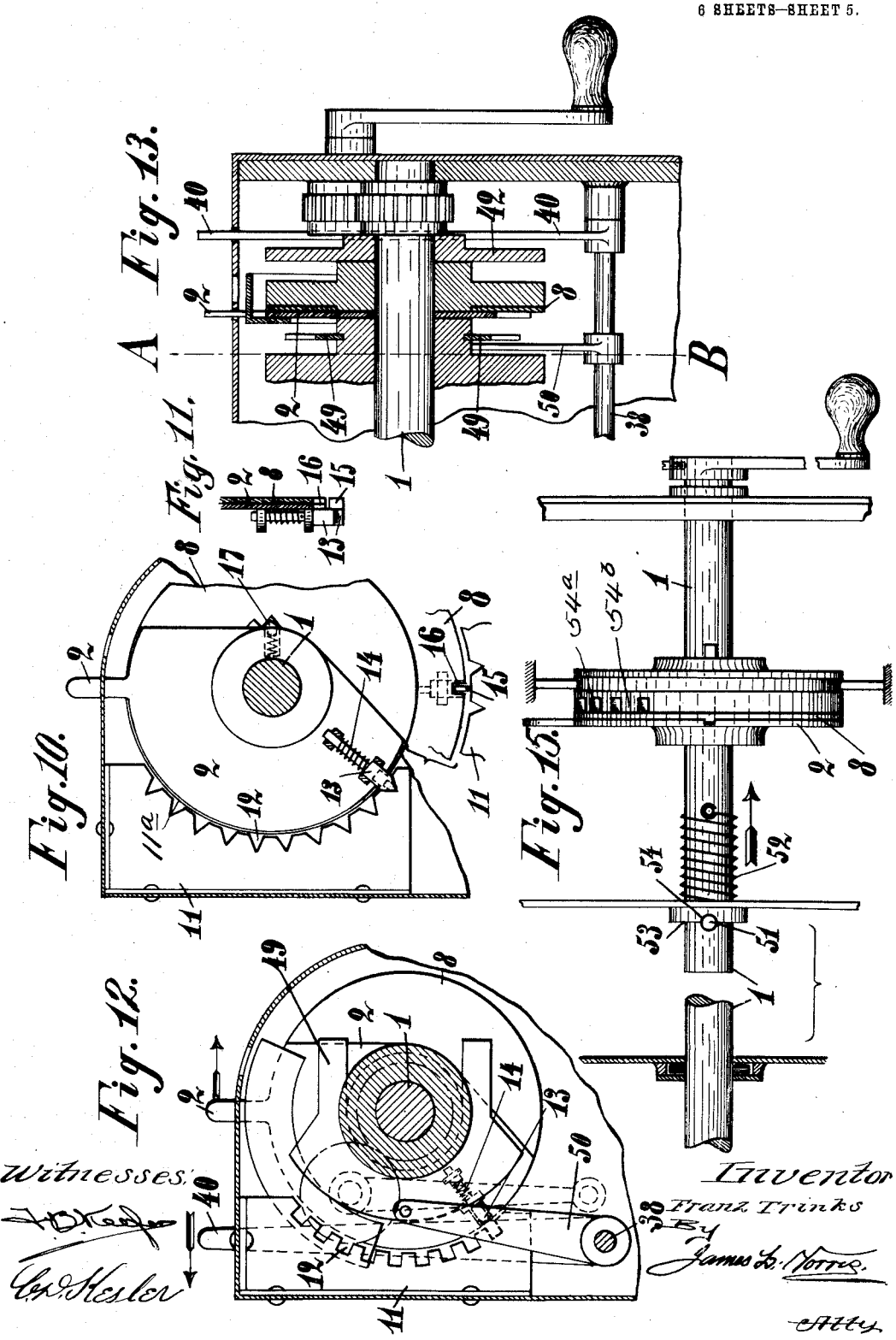

F. TRINKS.
CALCULATING MACHINE.
APPLICATION FILED NOV. 26, 1906.
979,358.
Patented Dec. 20, 1910.
6 SHEETS—SHEET 6.
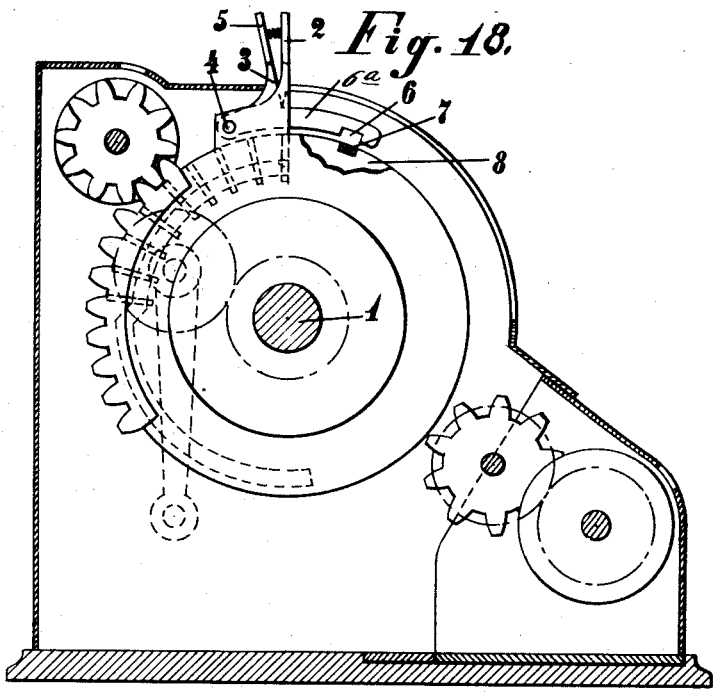
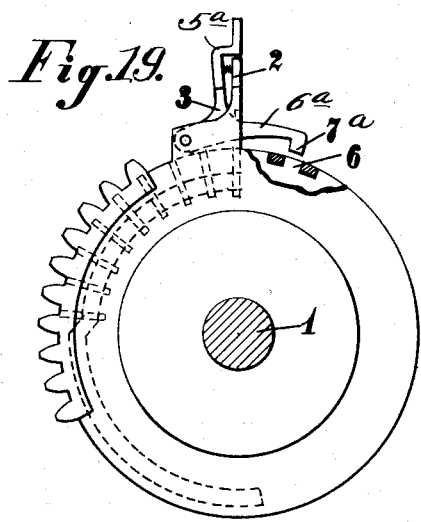
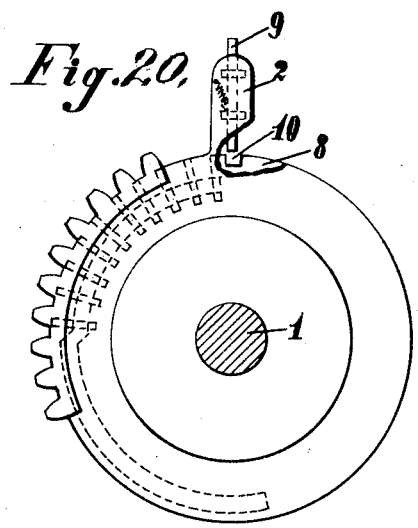
Witnesses:
Inventor
Franz Trinks
By
James L. Norris.
Atty.

UNITED STATES PATENT OFFICE.

FRANZ TRINKS, OF BRUNSWICK, GERMANY.

CALCULATING-MACHINE.

979,358.   Specification of Letters Patent.   Patented Dec. 20, 1910.

Application filed November 26, 1906. Serial No. 345,214.

*To all whom it may concern:*

Be it known that I, FRANZ TRINKS, engineer, subject of the Emperor of Germany, residing at Brunswick, Duchy of Brunswick, Empire of Germany, have invented certain new and useful Improvements in and Connected with Calculating-Machines, of which the following is a specification.

It is a well known construction in calculating machines to have the adjustment of the values effected through the medium of a toothed wheel having movable or shiftable teeth and operable by a cam disk connected to each of the said adjusting wheels to bring a given number of the teeth into working position. The cam disks are turned by means of small handles which project from the peripheries of the disks through slots in the machine casing, as illustrated in U. S. Patent No. 650,066, granted to William Kuttner, May 22, 1900, and U. S. Patent No. 823,375, granted to me June 12, 1906. Furthermore, calculating machines are well known in which, in addition to the cam disks, levers are also provided on the adjusting mechanism, by means of or with which levers the cam disks are turned and thereby the movable or radially displaceable teeth of the adjusting wheels are brought into or out of working position, see for instance U. S. Patent 843,506, granted to me February 5, 1907. The levers in this latter patented construction either engage pin projections on the cam disks and thereby carry the cam disks with them, or the levers lie with their free ends immediately adjacent the handles of the cam disks and may be grasped simultaneously with these handles. The first mentioned organization has the disadvantage that the cam disk which has been adjusted by an additional lever cannot be returned by such lever to zero-position, and the second organization necessitates the use of a special form of lever, and also requires two levers to be grasped and moved simultaneously.

The object of the present invention is to obviate the disadvantages specified, and the improved mechanism for this purpose is materially simplified by dispensing with the use of the handles for the cam disks. This improvement consists, therefore, of coupling means between the additional levers and the cam disks, and by the use of the coupling means the levers, during the adjusting movement, may be effectively and firmly coupled with the cam disks in both directions of rotation, and subsequently uncoupled before or at the commencement of the actual calculating operation of the mechanism.

In the drawings:—Figure 1 is a cross section of a calculating machine, taken on line 1—1 of Fig. 4, Fig. 2 a longitudinal section of the machine, Fig. 3 a detail view, Fig. 4 a plan view of Fig. 1, Fig. 5 a detail view showing the coupling means in engagement, Fig. 6 the coupling means out of engagement, Fig. 7 shows a modified construction in longitudinal section, the counting mechanisms and other parts being removed. Fig. 8 is a cross section of the mechanism shown by Fig. 7. Fig. 9 is a detail view of part of the mechanism shown by Fig. 8. Figs. 10 and 11 are views of another modification. Figs. 12 to 14, inclusive, show detail sectional views of still further modified forms of the mechanism. Fig. 15 is a detail elevation partially broken away and in section showing means for automatically coupling and uncoupling the cam disk and the lever. Figs. 16 and 17 respectively show a transverse section and a partial longitudinal section, illustrating further modifications of the mechanism for automatically coupling and uncoupling the cam disk and the lever. Figs. 18 to 20 show still further modifications in which there is no automatically operating coupling means between the cam disk and the additional lever.

Similar characters of reference are employed to indicate corresponding parts in the several views.

Referring to Figs. 1 and 2, disks 59 are fixed upon a common shaft 1 rotated by means of intermediate gear wheels 62, 63 from the main crank 64 of the machine. Each of the disks 59, the so-called adjusting wheels, has nine radially displaceable teeth 65 and a well known concentric cam disk 8, by the rotation of which cam disk relatively to the adjusting wheel 59 the teeth 65 are brought into and out of operating position. The wheels 59 when rotated transmit their movement by means of the gear wheels 66, 67 to the counting disks 68 of the main counting mechanism, which counting mechanism is mounted upon a carriage 69 displaceable parallel with the axis 1, so that the teeth 65 of the adjusting wheels 59 if desired may act directly upon the toothed wheels 66 of higher value places. The counting mechanism is also provided with well known tens transferring means 70, 71, 72. On the carriage 69 is also mounted co-axially with the main counting mechanism 68 a known crank revolutions counting mechanism 73, one counting disk of which is moved one tooth forwardly or backwardly if the crank 64 makes a full rotation. This is effected by means of a gear wheel 74 fixed on the shaft 1 and a second gear wheel 75, the one tooth 76 of which engages one of the wheels 77, loosely mounted on a shaft 78 and in engagement with the gear wheels 79 of the counting disks 73. Thumb-screws 80, 81 serve to bring the counting disks 68, 73 into zero position. In addition to the cam disks 8 there are levers 2 loosely and revolubly mounted on the shaft 1, each adjacent to a cam disk 8, the handles 2× of said levers 2 projecting through slots 82 of the machine to the outside, so that these levers may be grasped and turned, see Fig. 4.

According to the present invention the additional levers 2 form a segment or circular surface and the said levers and cam disks 8 respectively have peripheral teeth 2ª and 8ª, see particularly Figs. 1 and 6, and these teeth, when the levers and disks are in a condition of repose (Fig. 1) coincide, the teeth 2ª and 8ª being engaged by a common toothed wheel or pinion 21, revoluble on a shaft 20 parallel with the main shaft 1. The width of the teeth of the wheel 21 corresponds to the combined thickness of the teeth 2ª and 8ª, and in view of these proportions both levers and disks are so coupled that movement of the lever 2 will result in a corresponding movement of the disk 8 adjacent to said lever. The levers 2 have their peripheries 18 provided with the numerals "0" to "9", see Fig. 3, and after the adjustment is made to indicate a certain value, the numeral corresponding to such adjustment is visible through a display opening 19 in the casing cover, see Figs. 1 and 4.

During the operation of calculation the parts are set in motion by rotating the shaft 1 and the cam disks 8 are included in such operation, but the levers 2 are not turned with the disks 8 so that the setting remains recorded, and the disks 8 and levers 2 are released before the commencement of the rotation of the shaft 1 by means as follows: A slide rod 23 is connected by means of a two-armed lever 22 with the shaft 20 on which the broad toothed wheels 21 are revolubly mounted, it being understood that there will be as many toothed wheels 21 as there are pairs of disks and levers. A spring 24 acts on the slide rod 23 in a direction for disengaging the wheel 21 from the teeth of the disks 8 and levers 2. Displacement of the slide rod 23 is prevented when the shaft 1 is stationary, Figs. 1 and 2, by a spring pin 25, which engages the end of the crank 64 of a known type, the said spring pin encountering the face of the said slide rod, and the spring 26 thereof opposes the spring 24 and is strong enough to overcome the tension of the latter. As soon as the crank end or handle is displaced in the direction indicated by the arrow for the purpose of releasing and turning the crank, the spring pin 25 releases the slide rod 23 and the latter under pressure of the spring 24 displaces the shaft 20 through the medium of the two armed or shifting lever 22, and by this means the toothed wheels 21 are removed from contact with the teeth 8ª and 2ª of the disks 8 and levers 2, see Fig. 6. The shaft 20 which is only axially displaceable has toothed projections 27 connected thereto which when the shaft is displaced (Fig. 6) engage the teeth 2ª of the levers 2 and lock the said levers in adjusted position, and, as shown by Fig. 1, spring actuated pawls 28 are secured to the casing and operate in a similar manner to engage the teeth of the said levers 2. The pawls 28 operate as check devices to prevent the levers 2 from having undesirable movement after they are uncoupled from the disks 8 and which movement of the levers 2 under these conditions might otherwise ensue in consequence of the operation of the machine crank or of other parts of the machine. In other words, the pawls 28 prevent rotation of the levers 2, the teeth of the levers being engaged by the pawls in both directions as soon as the levers are uncoupled by axial shifting of the wide gear wheels 21 from the cam disks 8, and by this means the levers 2 are prevented from revolving during the revolution of the crank by vibrations incident to such crank operation. The uncoupling of the levers 2 takes place automatically if the handle of the crank 26 is shifted with the yielding pin 25 previous to the start of the crank revolution in the direction of the arrow, as shown by Fig. 2, only during the crank revolution and operation of the disks 8 to radially shift the teeth 65. The yielding pin 25 is a member or portion of the crank and is a structure that is well known in the art, said pin serving as a catch or locking means for maintaining the crank in its starting position or position of rest and insuring the operation of the crank from a predetermined starting position. On the completion of the calculating operation the return of the wheels 21 to normal position and recoupling of the disks 8 and levers 2 immediately takes place through the operation of the spring pin 25 pushing back the slide rod 23.

As heretofore indicated, the shaft 1 is rotated by the crank 64 of the machine and the disks 59 with their radially slidable teeth 65 are rotated with the shaft. For the sake of brevity only one disk 59, one cam disk 8, and one lever 2 will be referred to in explaining the operation of the machine as thus far described. The cam slot of the disk 8 is engaged by the lateral extensions of the teeth 65 of the disk 59 and by revolving the disk 8 by hand, the disk 59 during such movement remaining at a standstill, the teeth 65 are shoved outwardly or inwardly with relation to the periphery of the disk 59 in accordance with the direction of movement imparted to the disk 8. The hand or manual operation of the disk 8 is effected through the medium of the lever 2 by means of the handle $2^x$ projecting through the casing of the machine. The cam disk 8 and the lever 2 both have the same diameter and are freely revoluble on the shaft 1. The two sets of teeth of the disk 8 and lever 2 are engaged by the gear wheel 21 common to both and revolubly mounted on the shaft 20, the wheel 21 being about as wide as the combined disk 8 and lever 2. The wheel 21 serves as the coupling means for the disk 8 and lever 2 and when the lever 2 is manually operated or revolved through the medium of the handle $2^x$ the disk 8 is similarly turned and the number of teeth 65 of the disk 59 adjacent to the operated disk 8 and lever 2 will always correspond to the actual angle or degree of rotation of the said lever 2 and disk 8. If it is desired to transfer a sum of numbers represented by the outward projection of the teeth 65 by a revolution of the hand-crank of the machine to the counting disks 68, the coupling between the cam disk 8 and the lever 2 must be broken or the said disk and lever released from unitary action because the disk 8 in order to preserve the sum of numbers for which the teeth 65 have been set must rotate with the crank 64 and disk 59, and during the latter operation the lever 2 does not rotate owing to the fact that the gear wheel 21 is shifted axially on its shaft to disengage the same from the teeth $2^a$ of the lever 2. To accomplish this uncoupling operation, the shaft 20 carrying the gear 21 is axially slidable and is under continual spring tension and has a normal tendency to move the gear wheel 21 out of engagement with the teeth of the lever 2. The spring tension of the shaft 20 is ordinarily opposed or prevented from shifting the shaft by the spring pin 25 of the machine crank, but as soon as the machine crank is released for the purpose of giving it a revolution, the handle 26 of the crank together with the pin 25 is drawn to the right and the shaft 20 with the wheel 21 is shifted by the spring 24 and the coupling connection between the cam disk 8 and the lever 2 is broken, as shown by Fig. 6. On the shaft 20, which does not rotate, the teeth 27 are secured and engage the teeth $2^a$ of the lever 2 when the gear wheel 21 is thrown out of engagement with relation to the said teeth $2^a$, and the said teeth 27 in conjunction with the pawl 28 hold the lever securely against accidental movement or displacement during the calculation. After the calculation is completed, or when the crank 64 has again returned to its starting position as shown by Fig. 2, the spring pin 25 comes into play and moves the shaft 20 against the resistance of the spring 24, and the gear wheel 21 is correspondingly shifted to engage both sets of teeth $8^a$ and $2^a$. After the coupling between the cam disk 8 and lever 2 has thus been restored, the operator can turn the lever 2 backwardly and at the same time the cam disk 8 is also moved to its original position and the teeth 65, which have been projected, are drawn inwardly into the disk 59. It will therefore be understood that the levers 2 remain immovable during the crank revolution, that is, during the operation of calculation and do not rotate with the cam disks, and, further, turning of the levers 2 during the crank revolution is prevented by the pawls 28 alone or in co-action with the teeth 27.

Figs. 7 to 9, inclusive show another form of the machine involving the invention. In this construction the disks 8 and levers 2 have similar central perforations $29^a$ and each perforation has a notch 29 formed as a part thereof and in which a broad projection 30 of a ring 31 inclosed by the disks 8 and levers 2 engages, and whereby the disks and levers are coupled or connected for joint operation. Each ring 31 is displaceably mounted on the shaft $1^x$, and is provided on its inner side with an annular chamber $32^a$, into which project pins 32 which impede or obstruct the free displacement of the ring, the pins 32 being fixed to bars 33 adjustable longitudinally in grooves $33^a$ formed in the shaft 1, the rings being displaceable in the direction indicated by the arrow in Fig. 7. By means of the bars 33 the rings are moved longitudinally over the shaft $1^x$ and the projections 30 are withdrawn from the notches 29 of the levers 2, see Fig. 9, and thereby the said levers are uncoupled. Displacement of the bars 33 may, in this instance, be effected by means of the locking pin of the crank, as shown by Figs. 1 to 6 inclusive, or by other means which will be presently specified. A sleeve 34 is connected to the bars 33, and with this sleeve a two-armed lever 35 pivotally mounted on the machine casing engages by means of pins 36 in such manner that when the said lever is turned or moved in the proper direction the bars 33 are displaced. The lever 35 has a spring 37 attached thereto and to the casing, the said spring constantly tending to draw the lever into such position as to set up a coupling between the disks 8 and levers 2, and in opposition to the tension of the spring said lever 35 is moved by means of an arm 39 mounted on a shaft 38 below the shaft 1ˣ, and the said arm 39, through the medium of a lever 40 mounted thereon and located outside the machine casing, is turned by rotating the said shaft 38 and caused to encounter an inclined face 41 of the lever 35 and force the latter sidewise. In this particular organization of the machine the crank is not utilized for uncoupling the disks 8 and levers 2, but a device for locking the crank is provided in order to force the person using the apparatus to uncouple the disks 8 and levers 2 by means just explained before turning the said crank, and this particular locking device for the crank is released when the disks 8 and levers 2 are uncoupled. This particular locking device for the crank comprises a disk 42 mounted on the shaft 1ˣ, see Figs. 7 and 8, the said disk being provided with a peripheral notch 43. When the crank is in a position of repose, this notch 43 is engaged by a pin 44 projecting from an arm 45 mounted on the shaft 38 and thus the crank is locked against movement through the shaft 1ˣ, and will remain locked until the lever 40 has been turned. The turning of the lever 40, as will be seen, releases the pin 44 from the notch 43. The movement of the shaft 38 by the lever 40 may also effect the locking of the levers 2, a rod 46 being connected to the shaft 38 by means of two arms 47, so that when the said shaft 38 is turned, the rod 46 bears against the pawls 28 engaging the teeth of the levers and prevents the said pawls being lifted out of the teeth. Backward movement of the rod 46, by turning the shaft 38, is prevented during the rotation of the crank for actuating the main shaft 1ˣ, by the pin 44 pressing against the periphery of the disk 42. As soon as the crank comes into a position of repose, the pin 44 under the influence of a spring 48 connected to one arm 47 again engages the rod 43 and locks the crank against movement and at the same time the levers 2 are coupled with the disks 8.

A further modification is shown by Figs. 10 and 11. In this construction a plate 11 is secured to the casing of the machine and has an arcuate recess 11ᵃ provided with teeth with regularly spaced notches 12, the plate being disposed partially around the lever 2, the number and distance apart of the notches 12 corresponding to the several adjustments of the cam disks. A radially displaceable pin 13 is mounted on the lever 2, the latter being of disk-shape, and said pin is normally forced by a spring 14 into one of the notches 12 of the plate 11. If the disk-like lever 2 be turned by means of its handle, the curved wall of the recess 11ᵃ between the notches 12 causes the pin 13 to be forced inwardly toward the shaft 1ˣ, the engaging end of the said pin being of conical contour and having a lateral projection 15, Fig. 11, which enters a corresponding notch or recess 16 in the cam disk 8 and serves as a coupling means between the disk-like lever 2 and the said disk 8, until the pin 13, by further rotation of the disk-like lever 2 and disk 8, springs into the next notch 12 and releases the disk 8, this operation taking place at a time when the pin 13 is moving between the notches. As soon as the pin engages one of the notches the projection 15 is released from the notch 16 of the cam disk. It is also preferable to provide the disk 18 with a spring-locking device 17, which insures a correct position of the recess 16 with relation to the pin 13.

A still further modification of the construction is shown by Figs. 12 to 14, inclusive, Fig. 12 being a cross section on the line A—B, Fig. 13. This construction of the machine is in some respects similar to that shown by Figs. 10 and 11, the radially displaceable locking pin 13 being similarly connected to the lever 2 and having the spring 14 tending to press the pin outwardly from the lever. The pin 13 in this instance also has the lateral projection 15 to engage the notch 16 in the periphery of the cam disk 8. The plate 11 with notches 12ˣ of slightly different form is also used in the construction shown by Figs. 12 to 14, inclusive, and one of the additions to this previously described construction is a balancing knife edged plate 49 supported by and radially displaceable relatively to the shaft 1ˣ and is located at one side of the lever 2. This plate 49 bears against a lever 50 mounted on the shaft 38, as clearly shown by Figs. 12 and 13. Instead of this plate 49 a circular disk may also be employed having a perforation permitting its radial displacement; or, in other words, the plate 49 may be mounted loosely on the shaft 41 in any preferred manner. When the plate 49 is displaced by means of the lever 50 on the shaft 38, its periphery encounters a projection 13ᵃ of the locking pin 13, see Fig. 14, and lifts the projection 15 out of the notch 16 of the disk 8. To fix the lever 2 in adjusted position after uncoupling the disk 8, as just explained, and during the operation of calculating, the pawls shown in Figs. 7 to 9 may be used, or the mechanism that will now be described may be adopted. As just set forth, the plate 11 is used in this instance, and has a concaved or arcuate recess and notches 12ˣ in its edge facing the lever 2, the said notches corresponding in number and distance apart to the several adjustments of the cam disk 8. In one of these notches when the disk 8 and lever 2 are uncoupled, the free or outer end of the locking pin 13 enters and thereby prevents turning of the lever 2. The release of this locking mechanism, until the crank rotation is completed or the shaft 1<sup>x</sup> has been operated as required, is prevented by the disk 8 with the periphery of which the projection 15 of the locking pin 13 is in contact. The coupling of the disks 8 and levers 2 may also be effected automatically just before the completion of the crank rotation from the main shaft 1<sup>x</sup> by the latter shaft in a manner similar to that known in connection with the counting mechanism shaft by axial displacement, and thus the disk and lever provided with corresponding projections will become uncoupled. One mode of carrying out this latter operation is illustrated by Fig. 15. On the main shaft 1<sup>x</sup> a pin 51 is mounted, and constantly pressing on the shaft is a spring 52, the said spring exerting a pull on the shaft in the direction of the arrow. The pin 51 closely bears on a collar or annular boss 53 of the machine casing, the said boss having a notch 54 formed therein and at the termination of the crank rotation the pin 51 is forced into the notch 54 and the shaft is correspondingly displaced in a longitudinal direction. In this displacement of the shaft 1<sup>x</sup>, the disks 8 and levers 2, the former being displaceable with the shaft, but the latter non-displaceable, are coupled by means of special toothed-shaped interengaging projections or the like until on the reoperation of the crank the pin slips out of the notch 54 and the spring 52 draws the shaft 1<sup>x</sup> back to normal position. The interengaging teeth are designated by the numerals 54<sup>a</sup> and 54<sup>b</sup>, and may be of any preferred form.

A still further modification in the construction for carrying out the object of the invention is shown by Figs. 16 and 17. The cam disks 8 are arranged on the shaft 1<sup>x</sup> immediately adjacent the known variable toothed operating wheels 59, which are adjusted in a known manner by means of said disks 8, and each disk has a peripheral notch 55 for engagement with a projection 56 held by the casing cover and located over the disk. A lever 2<sup>b</sup> carries said projection and is guided in a suitable slide 2<sup>c</sup> in the slots 58, according to the direction of rotation of the shaft 1<sup>x</sup>. The lever 2<sup>b</sup> has an exteriorly projecting handle 60 which may be of any suitable form and size, and by operating the said lever the cam disk 8 is turned with it and the toothed operating wheel 59 is simultaneously adjusted as to its position; or in other words, the operating wheel is actuated by the movement of the disk. As the projection 56 of the lever 2<sup>b</sup> will securely hold or engage the cam disk and carry the latter with it when the main shaft 1<sup>x</sup> is rotated through the operation of the crank, the engagement between the said lever and cam disk must be released before or immediately on the commencement of the crank rotation.

This release is effected in a manner similar to the arrangement shown by Fig. 15, by the displacement of the main shaft 1<sup>x</sup> and the coöperation of the pin 51 with a notch 54 of annular boss 53 through the tension of the spring 52. In this instance, as in the construction shown by Fig. 15, the crank 61, see Fig. 17, is turned and the pin 51 is forced out of the notch 54, and thereby the shaft 1<sup>x</sup> is displaced in a direction opposite to that indicated by the arrow. By this displacement of the shaft 1<sup>x</sup>, the projections 56 of the levers 2<sup>b</sup> are thrown out of engagement with respect to the cam disks 8, and so remain until after a complete revolution of the crank or after the completion of the actual calculation, when the pin 51 moving over the surface of the boss 53 again engages the notch 54 and the shaft 1<sup>x</sup> is free for longitudinal displacement by the tension of the spring 52. As the reëngagement between each cam disk 8 and lever projection 56 is only possible when the lever 2<sup>b</sup> is in position to engage the cam disk 8, it is preferable to provide the lever 2<sup>b</sup> with a locking device which only allows of the movement of the said lever during the stationary period of the crank, so that the projection 56 and recess 55 may again be caused to coincide on the completion of the crank rotation. The projection 56 may also be made laterally yielding in such way that when it has been displaced during the crank rotation it does not obstruct, on the completion of said crank rotation, the movement of the cam disk in an axial direction. In order to facilitate the adjustment of the cam disk a scale may be arranged in a known manner on the casing opposite each slot 58, and each lever 2<sup>b</sup> may be provided with a pointer to coöperate with the said scale, or there may be figure strips connected with the slides beneath the casing cover, these strips carrying on their perforations the numerals 0 to 9", and one of these numerals will always be visible through the aperture in the casing cover.

Figs. 18 to 20 show still further modifications with the difference over the foregoing described construction, that the coupling of the disks 8 and the levers 2 does not take place automatically when the levers 2 are moved. In the construction shown in Fig. 18 an elbow lever 3 is pivotally mounted at the point 4 on the lever 2, the latter being loosely mounted on the shaft 1<sup>x</sup> of the adjustable operating wheels, the said elbow lever having a projecting arm 5. This elbow lever is in such position with respect to the lever 2 that when the arm 5 is pressed against the latter a notch 6 in the curved part 6<sup>a</sup> of the elbow lever engages over a projection 7 of the cam disk 8. By this means the cam disk 8 is effectively coupled to the lever during opposite movements of the latter. The construction shown by Fig. 19 slightly differs from that illustrated by Fig. 18, and instead of providing the recess or notch 6, a projection 7ᵃ is formed on the arm 6ᵃ of the elbow lever, and the free terminal of the arm 5 of the same lever has an angular construction to extend over the upper end of the lever 2, as at 5ᵃ, so that both the said arm 5 of the elbow lever and the lever 2 must be grasped; or, in other words, one lever cannot be fully engaged without operating the other. In Fig. 20 the adjusting lever 3 shown by Figs. 18 and 19, is replaced by a spring actuated sliding pin 9, mounted on the lever 2 and radially displaceable. By applying a slight finger pressure on this pin 9, its lower end is pressed into a notch or recess 10 of the cam disk 8, or between projections, such as teeth on the said disk.

What is claimed is:—

1. In a calculating machine, operating wheels having adjustable teeth, in combination with means for varying the number of teeth projecting from said wheels, actuating means pivotally mounted coaxially with the operating wheels, means for coupling the said varying means with the actuating means, and a main shaft having means for rotating the same.

2. In a calculating machine, of the class set forth, the combination with operating wheels having adjustable teeth, of means for varying the number of teeth projecting from said wheels, actuating means pivotally mounted co-axially with said wheels, means whereby said actuating means and varying means may be coupled, and a main shaft having means for rotating the same.

3. In a calculating machine of the class specified, the combination with operating wheels, of drinks for varying the number of teeth projecting from said operating wheels, a series of disk levers serving as actuating means, the said disks and disk levers having corresponding teeth, means for coupling the disks and disk levers, a main shaft having an operating means, and means for moving said toothed wheels in and out of coupling position.

4. In a calculating machine of the class specified, the combination with operating wheels, of disks for varying the number of varying the number of teeth projecting from said wheels, a series of disk levers serving as actuating means, the disks and disk levers having corresponding teeth, means for coupling the disks and disk levers, a shaft on which said coupling is mounted, an operating means for the shaft, means carried by the said shaft operating means for shifting the shaft and causing the coupling means to be displaced from coupling position, and spring means for effecting the return of said shaft to normal position.

5. In a calculating machine of the class specified, the combination with toothed operating wheels having adjustable teeth, of disks to vary the number of teeth projecting from said wheels, a series of disk levers serving as actuating means for the disks, a series of rings, said wheels, disks and rings being co-axially arranged, the disks having recesses and the rings provided with projections, a main shaft on which the said parts are mounted, and shifting means for bringing the projections of each ring into engagement with the recesses in the adjacent disks and disk levers, whereby the said disks and levers are coupled for united movement.

6. An apparatus of the class specified, comprising in combination with a grooved main shaft and operating wheels having adjustable teeth, of disks for varying the number of teeth projected from said wheels, actuating levers, coupling rings, the disks, actuating levers for the disks and coupling rings being all co-axial with said shaft, bars located in the grooved shaft and engaging the coupling rings, means for operating said bars to move the rings into and out of coupling position, and means for rotating the said shaft.

7. In an apparatus of the class specified, the combination with a main shaft having disks and actuating levers disposed on said shaft, of coupling rings mounted on the shaft, bars engaging the coupling rings and operating to displace the rings, a main operating crank for the shaft, and means co-operating with the crank for locking the bar operating means when the crank is not in a position of repose.

8. In an apparatus of the class specified, the combination with a main shaft having toothed operating wheels thereon, of disks for varying the number of teeth on said wheels, a series of disk-levers coöperating with the disks and serving as actuating means for the latter, a radially disposed spring actuated coupling pin to engage with each of the said disks, the disks having recesses to coöperate with portions of the coupling pins on the disk levers, and means for engaging each of the pins to effect an uncoupling thereof.

9. In an apparatus of the class specified, the combination with a main shaft having toothed operating wheels thereon, of disks adapted to vary the number of teeth of the operating wheels, a series of disk-shaped levers serving as actuating means for the disks, the disks having recesses formed therein, a spring actuated radially disposed pin on each of the disk-shaped levers adapted to engage with the recess in the adjacent disk, and fixed plates adjacent to the disks and having notches to receive the said spring pins.

10. In an apparatus of the class specified, the combination with a main shaft having means for rotating the same, toothed operating wheels on the shaft, disks to vary the number of teeth of said wheels, and members serving as actuating means for the disks, of means for coupling the said members and disks, the coupling means being operated by the axial displacement of the main shaft.

11. In an apparatus of the class specified, the combination with a main shaft having means for rotating the same, toothed operating wheels, disks adapted to vary the number of teeth of said wheels, and members serving as actuating means for the disks, the shaft having a projection, of means for coupling the members and disks and operated by the axial displacement of the said main shaft, a recessed device for coöperating with the projection on the main shaft, and a spring acting to displace said shaft when the projection moves into the recess of the said device.

12. In an apparatus of the class specified, the combination with a main operating shaft, toothed operating wheels, disks to vary the number of teeth of said operating wheels, each of the disks having a recessed portion, of a casing extending over the said wheels and provided with slots, actuating members projecting through the slots and having portions adapted to engage the recesses in the disks, and means for axially displacing said disks for releasing them from engagement with the actuating members.

In testimony whereof I have hereunto set my hand in presence of two subscribing witnesses.

FRANZ TRINKS.

Witnesses:
WILHELM LEHRKE,
JULIUS SECKEL.